(12) United States Patent  (10) Patent No.: US 6,724,810 B1
Chapman  (45) Date of Patent: Apr. 20, 2004

(54) METHOD AND APPARATUS FOR DE-SPREADING SPREAD SPECTRUM SIGNALS

(75) Inventor: Kenneth D. Chapman, Woking (GB)

(73) Assignee: Xilinx, Inc., San Jose, CA (US)

( * ) Notice: Subject to any disclaimer, the term of this patent is extended or adjusted under 35 U.S.C. 154(b) by 602 days.

(21) Appl. No.: 09/715,465

(22) Filed: Nov. 17, 2000

(51) Int. Cl.$^7$ .......................... H04B 15/00; H04K 1/00
(52) U.S. Cl. ...................................... 375/150; 375/142
(58) Field of Search ................................. 375/130, 140, 375/142, 143, 147, 150, 152, 343

(56) References Cited

U.S. PATENT DOCUMENTS

| | | | |
|---|---|---|---|
| 4,758,745 A | 7/1988 | Elgamal et al. | |
| 4,821,233 A | 4/1989 | Hsieh | |
| 4,967,107 A | 10/1990 | Kaplinsky | |
| RE34,363 E | 8/1993 | Freeman | |
| 5,243,238 A | 9/1993 | Kean | |
| 5,245,227 A | 9/1993 | Furtek et al. | |
| 5,267,187 A | 11/1993 | Hsieh et al. | |
| 5,291,079 A | 3/1994 | Goetting | |
| 5,321,399 A | 6/1994 | Notani et al. | |
| 5,325,109 A | 6/1994 | Duckworth | |
| 5,343,406 A | 8/1994 | Freeman et al. | |
| 5,349,250 A | 9/1994 | New | |
| 5,352,940 A | 10/1994 | Watson | |
| 5,386,156 A | 1/1995 | Britton et al. | |
| 5,394,031 A | 2/1995 | Britton et al. | |
| 5,414,377 A | 5/1995 | Freidin | |
| 5,422,823 A | 6/1995 | Agrawal et al. | |
| 5,442,306 A | 8/1995 | Woo | |
| 5,481,206 A | 1/1996 | New et al. | |
| 5,488,316 A | 1/1996 | Freeman et al. | |
| 5,694,056 A | 12/1997 | Mahoney et al. | |
| 5,724,276 A | 3/1998 | Rose et al. | |
| 5,889,413 A | 3/1999 | Bauer | |
| 6,268,742 B1 | * 7/2001 | Chapman | ...................... 326/39 |
| 6,519,299 B1 | * 2/2003 | Wei-Ku et al. | .............. 375/343 |
| 2002/0080860 A1 | * 6/2002 | Wei-Ku et al. | .............. 375/147 |
| 2002/0080861 A1 | * 6/2002 | Wei-Ku et al. | .............. 375/147 |

FOREIGN PATENT DOCUMENTS

| | | | |
|---|---|---|---|
| EP | 0630115 A | 12/1994 | |
| GB | 2295738 A | 6/1996 | |

OTHER PUBLICATIONS

Xilinx, Inc. "The Programmable Logic Data Book" 1996, available from Xilinx, Inc., 2100 Logic Drive, San Jose, CA 95124, pp. 4–1 through 4–372.

Xilinx, Inc. "The Programmable Logic Data Book" 1999, available from Xilinx, Inc., 2100 Logic Drive, San Jose, CA 95124, pp. 3–1 through 3–22.

* cited by examiner

*Primary Examiner*—Jean B. Corrielus
(74) *Attorney, Agent, or Firm*—LeRoy D. Maunu; Edel M. Young; Justin Liu (57) ABSTRACT

A correlation circuit arrangement for de-spreading spread spectrum signals. In various embodiments, the correlation circuit arrangement includes an adder-subtractor and a shift register arrangement. The adder-subtractor adds an input sample value to or subtracts the sample value from an accumulated correlation value, responsive to an input PN code. The adder-subtractor is time-multiplexed between one or more PN code generators and correlation values are accumulated in the shift register arrangement. In another embodiment, transmission path delay can be analyzed by using the shift register arrangement to store correlation values that result from delaying the PN code across multiple chip periods.

15 Claims, 7 Drawing Sheets

METHOD AND APPARATUS FOR DE-SPREADING SPREAD SPECTRUM SIGNALS

CROSS REFERENCE TO RELATED PATENTS

The present invention is related to the following patents:

"LOOKUP TABLES WHICH DOUBLE AS SHIFT REGISTERS," by Bauer, U.S. Pat. No. 5,889,413 issued Mar. 30, 1999;

"CONFIGURABLE LOGIC BLOCK WITH AND GATE FOR EFFICIENT MULTIPLICATION IN FPGA'S," by Chapman et al., U.S. Pat. No. 6,427,156 issued Jul. 30, 2002; and "A TAP AND MATCHED FILTER ARRANGEMENT" by Kenneth D. Chapman, U.S. Pat. No. 6,268,742 issued Jul. 31, 2001.

The cross-referenced patents are assigned to the assignee of the present invention and the contents of the patents are incorporated herein by reference.

FIELD OF THE INVENTION

The present invention generally relates to spread spectrum signal processing, and more particularly to arrangements for de-spreading spread spectrum signals.

BACKGROUND

Code Division Multiple Access (CDMA) is a rapidly expanding data transmission technique and lies at the heart of the Universal Mobile Telecommunications System (UMTS), which is presently in development in many countries. CDMA transmits data over a wide bandwidth and separates the users of that bandwidth by coding each signal with a unique code sequence.

Generally, one part of a spread spectrum system involves breaking a data bit into multiple sub-bits or "chips". For example, the signal is multiplied by a Pseudo-random Noise (PN) code, which is a sequence of values of amplitude +1 and −1 which are commonly be represented by the logical levels of '0' and '1' respectively. To de-spread a received signal, input samples are multiplied by the same PN code, which effectively cancels the original coding.

A single time slot matched filter (STSMF) is used in a spread spectrum system to perform the multiplication operations in the receiver. The products generated each chip period are accumulated for a data period and used to indicate whether a valid data bit has been received and if so, the value of the data bit. Conventional STSMF designs for programmable logic devices, such as FPGAs consume a large portion of programmable resources available on a device, thereby making FPGA solutions relatively expensive. For multi-finger applications, the resource consumption is compounded by virtue of the multiple STSMFs and associated control and result collection logic.

The mobility of transmitters and receivers in spread spectrum systems introduces transmission path delay that must be addressed in de-spreading a signal. Over-sampling is one technique that is useful in de-spreading signals in mobile systems. However, the higher the over-sampling rate the greater the computational requirements of the de-spreader. Further complicating matters, when the transmission path delay exceeds a chip period, the timing of the code sequence must be adjusted so that the code sequence and signal are in phase. Present de-spreader techniques consume considerable resources if implemented on an FPGA.

An apparatus and method that address the aforementioned problems, as well as other related problems, for FPGAs and other types of electronic devices are therefore desirable.

SUMMARY OF THE INVENTION

A correlation circuit arrangement for de-spreading spread spectrum signals is presented in various embodiments. In one embodiment, the correlation circuit arrangement includes an adder-subtractor and a shift register arrangement. The adder-subtractor adds an input sample value to or subtracts the sample value from an accumulated correlation value, responsive to an input PN code. The adder-subtractor is time-multiplexed between one or more PN code generators and correlation values are accumulated in the shift register arrangement. In another embodiment, transmission path delay can be analyzed by using the shift register arrangement to store correlation values that result from delaying the PN code across multiple chip periods. In other embodiments, the adder-subtractor and shift register arrangement are in various combinations implemented with function generators of a programmable logic device.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings in which.

DETAILED DESCRIPTION

Various embodiments of the present invention are described in terms of a circuit implemented on a particular field programmable gate array (FPGA). Those skilled in the art will appreciate that the invention could be implemented on programmable logic devices (PLDs) other than FPGAs, for example CPLDs, of adapted to an ASIC implementation.

The general method by which data are transmitted in a direct sequence spread spectrum system is as follows. In transmitting data, a pseudo-random noise (PN) code is applied to each bit of data at a selected "chip" rate. A PN code is a sequence of bits having values of −1 or +1 in polar systems or values of 0 or +1 in non-polar systems. Thus, a bit of data is coded into a plurality of sub-bits or "chips", thereby spreading the bandwidth of the signal. A data bit is coded by multiplying the data value by a sequence of PN codes.

In receiving a signal, the original signal is de-spread by multiplying the received signal by the same PN code that was used to spread the signal. The receiver samples the signal at a selected rate. In a simple system, the sample rate is the same as the chip rate. More complex systems oversample the received signal relative to the chip rate. Since some systems are required to de-spread signals from multiple sources transmitting over the same carrier frequency, a separate de-spreader finger is arranged for each PN code.

Figure 1:
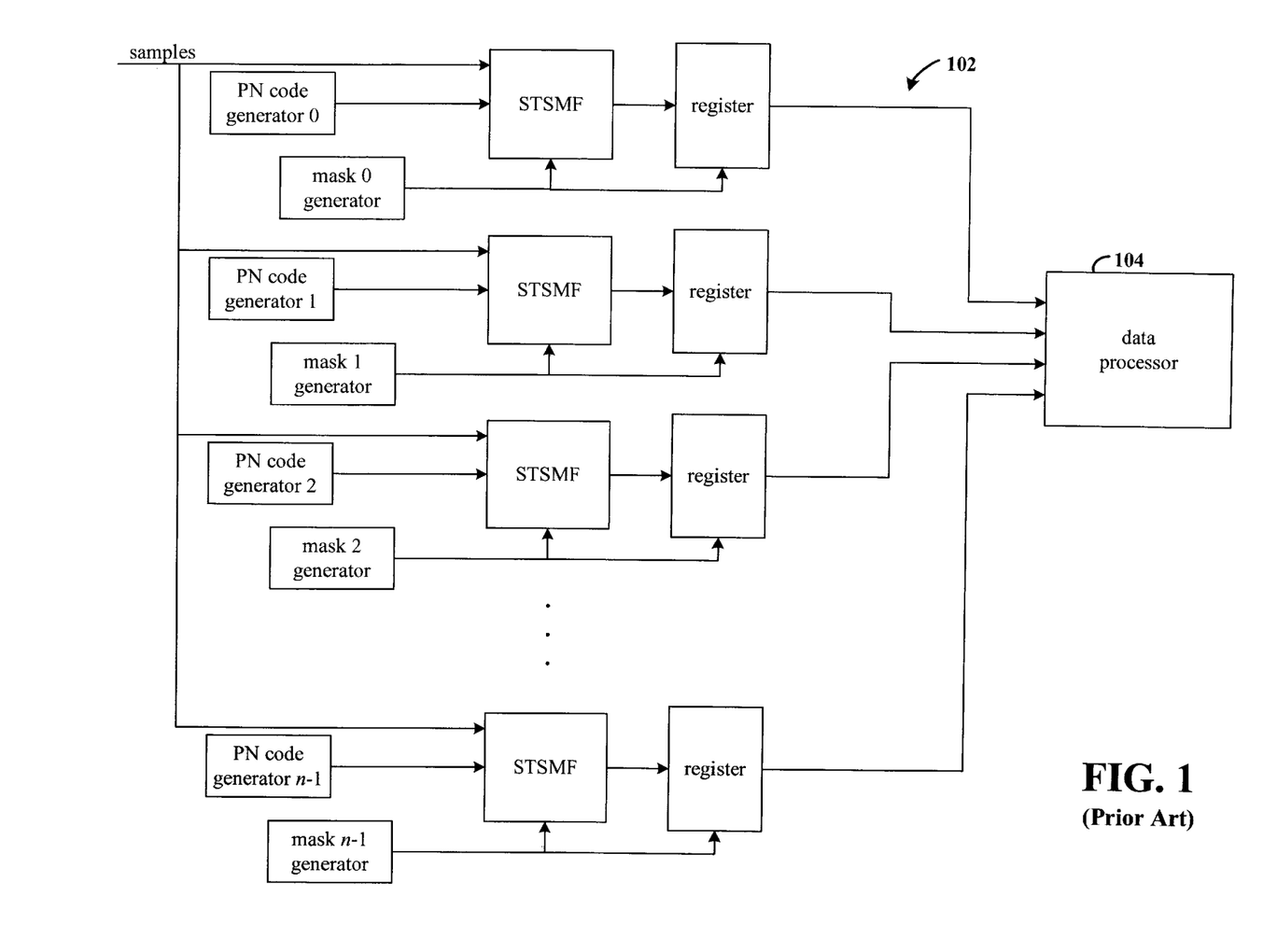
FIG. 1 is a functional block diagram of an example de-spreader arrangement having multiple fingers.

FIG. 1 is a functional block diagram of an example de-spreader arrangement having multiple fingers. Each finger of de-spreader arrangement 102 accumulates a correlation value as a function of input sample values and respective PN codes. A new correlation value is accumulated each chip period. The magnitudes of the correlation values are used to discern which PN code(s) suitably de-spread the transmitted signal.

Each finger includes a PN code generator, a single-time-slot matched filter (STSMF), and a register in which a correlation score is stored. The same sample value is input to each finger. Each PN code generator provides a PN code to the associated STSMF, which performs a multiply and accumulate function over each chip period. At the end of each data period, the accumulated correlation value is provided to data processor 104, which determines whether the de-spread signal is noise or valid data. For example, a correlation value greater than a selected threshold indicates a data bit having the value "1", and a correlation value less than a selected threshold indicates a data bit having the value "0". Each mask generator clears the associated correlation value in the associated register (STSMF accumulator) at the end of a data period, causing the associated STSMF to begin computing a new correlation value.

Figure 2:
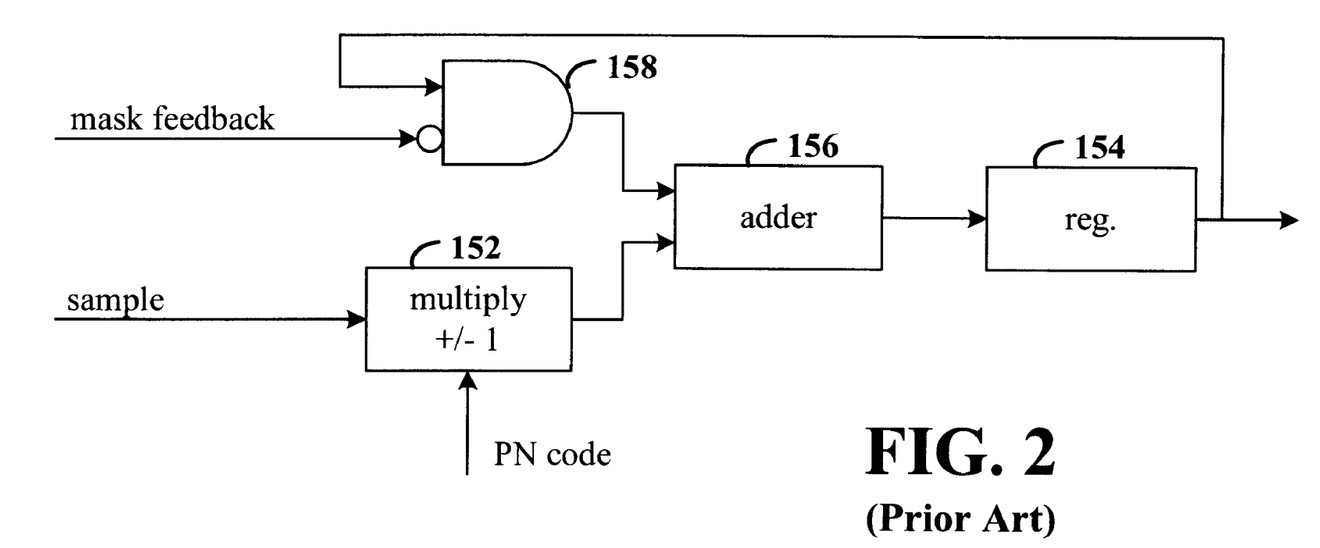
FIG. 2 is a functional block diagram of an example single time slot matched filter (STSMF)

FIG. 2 is a functional block diagram of an example single time slot matched filter (STSMF). The STSMF performs a multiply and accumulate function over a selectable interval for input sample values and PN code bits. The feedback of the accumulated correlation value is masked at the end of each data period, thereby commencing accumulation of a new correlation value without expending a clock cycle to perform a reset.

Multiplier 152 multiplies an input sample value by either +1 or −1, depending on the value of the input PN code bit. The result is added to the accumulated correlation value from register 154 by adder 156. The new accumulated correlation value is stored in register 154 for feedback to adder 156 for the next iteration.

At the end of a data period, the mask feedback signal is set to logic level "1", causing AND gate 158 to output logic level "0", thereby masking feedback of the correlation value from register 154 to adder 156. Thus, each data period begins with a new correlation value that is the product of the input sample value and the input PN code bit.

Figure 3:
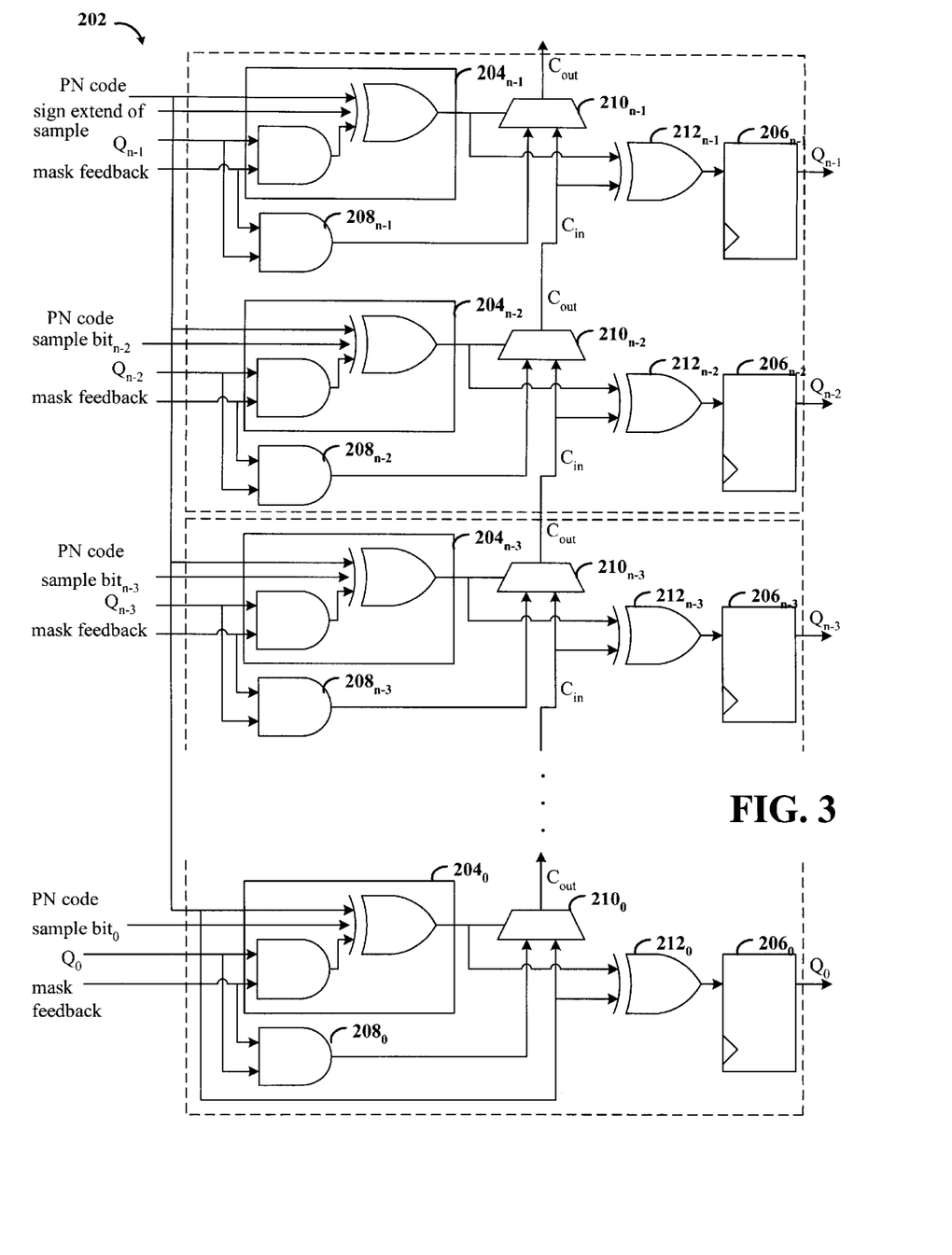
FIG. 3 is a schematic of an STSMF arrangement in accordance with one embodiment of the invention.

FIG. 3 is a schematic of an STSMF arrangement in accordance with one embodiment of the invention. Each dashed box represents a slice of an FPGA, for example, the Virtex FPGA from Xilinx. In accordance with the illustrated implementation of an STSMF, an n-bit correlation value can be generated using n/2 slices of a Virtex FGPA. Thus, if compact PN code generators are used, thousands of de-spreader fingers could be implemented in a single FPGA.

The structure of STSMF arrangement 202 is derived from the programmable resources of an example FPGA and from optimization of the STSMF function illustrated in FIG. 2. Multiplier 152 (FIG. 2), implementing a 2's complement function, and adder 156 can be combined into an add/subtract function as explained in the cross-referenced application by Chapman. In addition, the function of mask AND gate 158 (FIG. 2) can be merged with the add/subtract function using the MULT-AND gate that is available in the FPGA, as described in the cross-referenced patent entitled, "CONFIGURABLE LOGIC BLOCK WITH AND GATE FOR EFFICIENT MULTIPLICATION IN FPGA'S." For example, each of function generators $204_0$–$204_{n-1}$ are function generators that implement the illustrated logic.

Each of function generators $204_0$–$204_{n-1}$ implements the XOR/AND logic as illustrated. The XOR function of each function generator receives as input the PN code bit, a bit of the sample value, and the output of the AND function. Note that the high order bit(s) of the sample is a sign extension bit(s).

The AND function of each function generator receives as input the bit value fed back from the associated flip-flop and the mask feedback signal. When the mask feedback signal is logic level "1", the feedback bit value Qi is ignored in the accumulation. Thus, the correlation value can be reset to begin a new chip period without having to clear the contents of the flip-flops $206_0$–$206_{n-1}$.

Each of MULT-AND gates $208_0$–$208_{n-1}$. receives as input the mask feedback signal and the associated feedback bit of the correlation value. The output signals from the MULT-AND gates $208_0$–$208_{n-1}$ are input to an associated one of multiplexers $210_0$–$210_{n-1}$ each of which selects between the carry-in signal, $C_{in}$ and the associated MULT-AND gate. The value of the data bits held in flip-flops $206_0$–$206_{n-1}$ results from the outputs from the associated XOR gates $212_0$–$212_{n-1}$, which receive as inputs the respective carry-in signals and outputs from the respective function generators.

It will be appreciated that the sample input generally has fewer bits than does the accumulator. Where the result has a greater number of bits than the input sample, the most significant bit of the input sample is re-used to perform sign extension.

Figure 4:
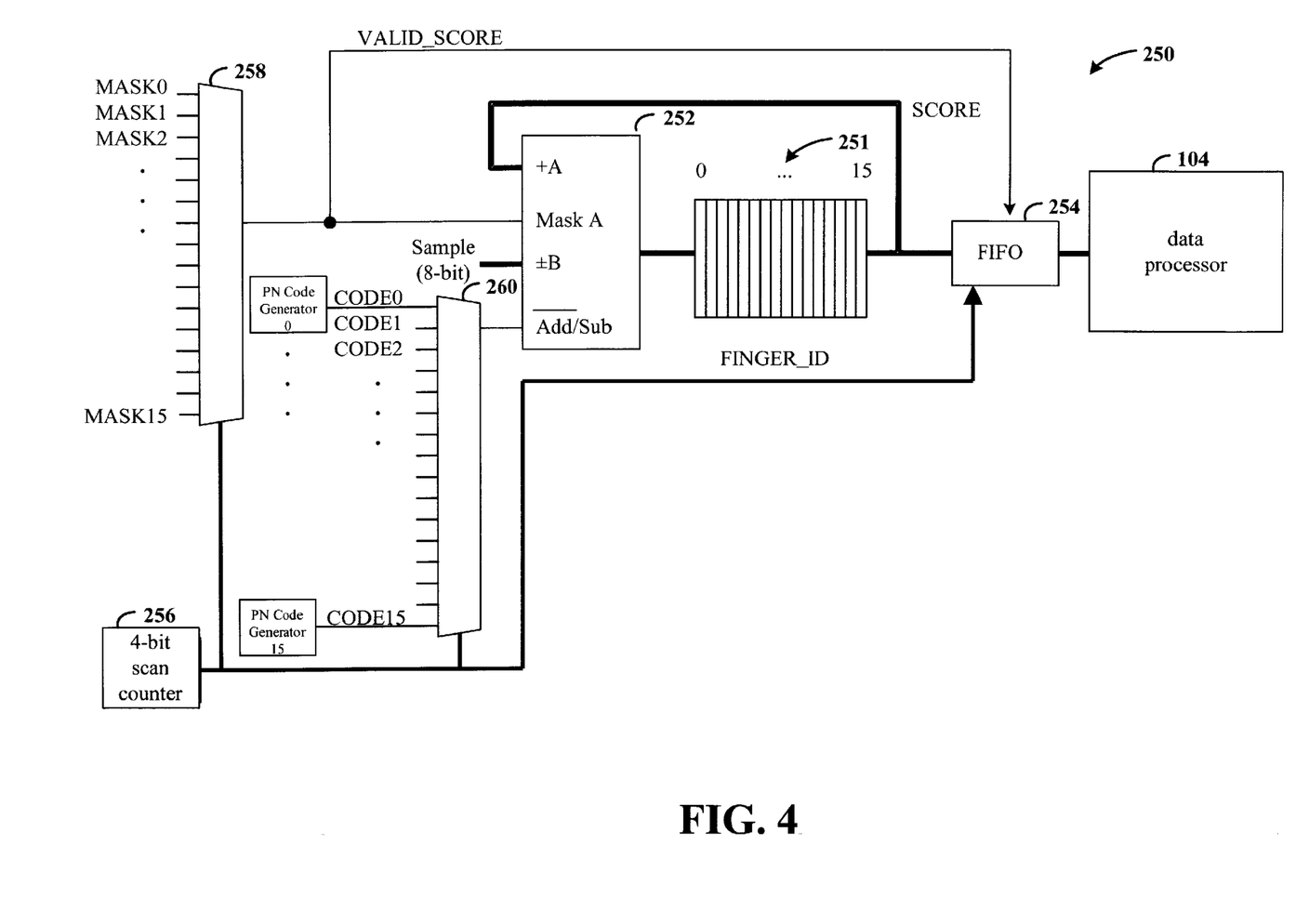
FIG. 4 is a functional block diagram of an example time-multiplexed de-spreader arrangement in accordance with another embodiment of the invention.

FIG. 4 is a functional block diagram of an example time-multiplexed de-spreader arrangement in accordance with another embodiment of the invention. De-spreader arrangement 250 includes a 16-stage shift register arrangement 251, which allows a single arithmetic unit to be used for 16 fingers. It will be appreciated that combining the individual registers of de-spreader 102 (FIG. 1) into a single shift register arrangement and time-multiplexing the mask signals and PN codes reduces the amount of hardware needed for a multi-finger de-spreader. Specifically, one arithmetic unit is used for 16 fingers instead of 16 arithmetic units (one for each finger). The time multiplexed nature of de-spreader arrangement 250 also removes a large overhead of logic multiplexers in order to read 16 separate units. While the example arrangement includes a 16-stage shift register arrangement, and is therefore suitable for 16 fingers, it will be appreciated that other embodiments could be implemented using more or fewer shift registers, depending on application requirements, FPGA programmable resources, and the number of clock cycles available in the time to perform time sharing.

The example arrangement operates at 16× the correlation rate of a finger (an accumulation for a finger occurs every 16 cycles). A different mask and PN code bit are selected for each clock cycle, and the previous correlation value for a finger will feed back to the STSMF at the appropriate time. Thus, with every clock cycle a correlation score is computed and stored in shift register 0 for one of the fingers.

Adder-subtractor 252 is the arithmetic unit that computes the correlation values for the different fingers. In one embodiment, the adder-subtractor can be implemented in accordance with the implementation of STSMF arrangement 202 (FIG. 3). However, instead of feedback being directly provided by the flip-flops (e.g., $206_0$–$206_{n-1}$) of the adder-subtractor, the flip-flops are coupled to the input ports of the first shift register 0 and the feedback data is provided by the last shift register 15.

In one embodiment, shift register arrangement 251 can be implemented in accordance with the teachings of the application/patent to Bauer, which teaches configuration of FPGA look-up tables (also "function generators) as shift registers. Each function generator can be configured as a shift register having 1 to 16 bits. Thus, a collection of function generators can be configured to implement the shift register arrangement, wherein each function generator is a bit slice of the delayed correlation values (e.g., one of the function generators shifts bit 0 of correlation values 0–15). The shift registers in shift register arrangement 251 are numbered 0–15. The number of function generators and size of adder subtractor 252 will depend on the maximum correlation value.

FIFO 254 is used to capture final correlation values and is enabled when a mask signal is presented to the STSMF. Since a mask signal indicates the end of a data period, the current correlation value for the finger that is identified (FINGER_ID) by counter 256 is the final correlation value for the chip period. Thus, the mask signal is used both to write-enable the FIFO for output from shift register 15 and to mask the feedback to adder-subtractor 252. Each register in the FIFO includes storage for both a correlation value and an associated finger identifier. The data process uses the finger identifier from the FIFO to identify the finger from which the correlation value was generated.

Multiplexer 258 selects from mask signals 0–15 responsive to scan counter 256, which generates a 4-bit finger identifier. Multiplexer 260 selects from PN codes 0–15, also responsive to the finger identifier. Counter 256 and multiplexers 258 and 260 can be implemented using understood designs for FPGAs.

Figure 5:
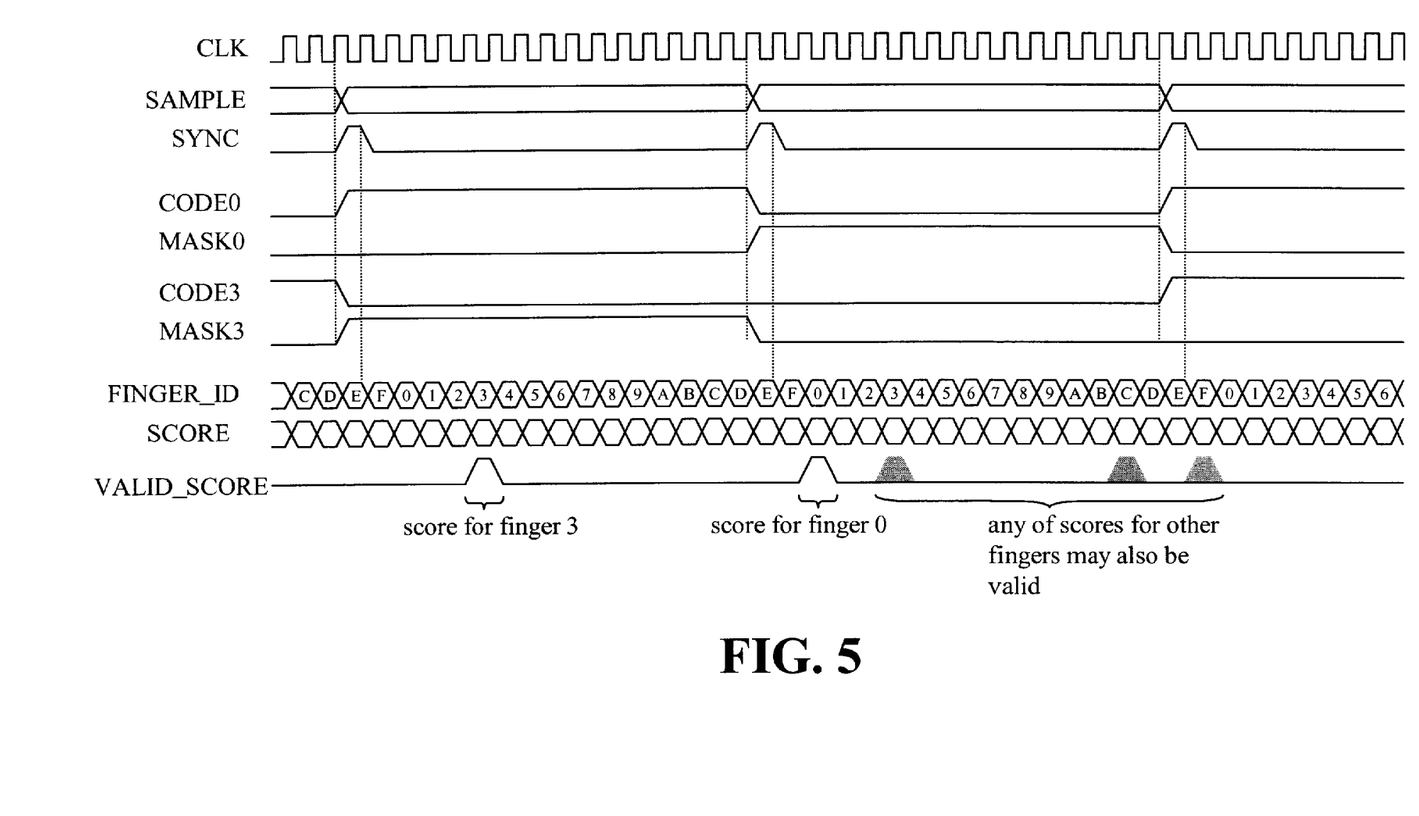
FIG. 5 is a waveform diagram that illustrates operation of the circuitry associated with de-spreader arrangement of FIG. 4.

FIG. 5 is a waveform diagram that illustrates operation of the circuitry associated with de-spreader arrangement 250 (FIG. 4). The waveforms illustrate operation of the circuitry relative to two of the fingers: finger 0 as illustrated by signals CODE 0 and MASK 0, and finger 3 as illustrated by signals CODE 3 and MASK 3. The sample rate is the same as the chip rate in de-spreader arrangement 250. The clock is 16× the chip-rate and enables 16 different PN codes to be tested against each sample.

A new sample value is input every 16 CLK cycles. The FINGER_ID signal indicates which finger correlation value is output from shift register 15.

The SCORE output may change with every clock cycle, depending on the contents of shift register 15. However, the VALID_SCORE signal is high only when the output SCORE contains a final correlation value, and therefore should be captured on the next rising edge of the CLK signal. The FINGER_ID signal identifies the finger from which the correlation value was accumulated. Thus, to capture from finger 3 the final correlation value for a data period, the MASK3 signal is held at logic level "1" for 16 CLK cycles. When FINGER_ID addresses finger 3, the correlation value from finger 3 is in shift register 15, the VALID_SCORE signal is logic level "1" to write-enable FIFO 254. At the same time that the correlation value from finger 3 is written to the FIFO, adder-subtractor 252 begins accumulating a new correlation value for finger 3 based on the value of CODE3. It will be appreciated that when FINGER_ID is 0, the correlation value for finger 0 is accumulated with the present sample. The scores of any of the other fingers may also be valid during the 16 CLK cycles.

The SYNC signal is optionally used to indicate the CLK cycle on which a new chip period begins. At logic level "1", the SYNC signal resets counter 256, thereby causing multiplexers 258 and 260 to begin scanning at finger 0. Since all the fingers are scanned within a chip period and are identified by FINGER_ID, the SYNC signal can be held at logic level 0 if desired and any start of scan position accepted.

The mobility associated with the communications systems in which despreaders are used forces implementations to consider transmission path delay in despreading signals. Since despreading CDMA signals is only possible when the PN code and the received signal are in phase, changes in transmission path delay must be observed and adjustments made in the correlation of the PN code.

In order to obtain the optimal mid-chip sample for correlation, the input signal is over-sampled relative to the chip rate. The greater the over-sample rate the greater the probability of realizing the correct data from the input signal.

All samples within a chip period must be considered to determine which sample is providing the best correlation. In addition, changes in correlation scores must be followed in order to determine the direction in which the tracking must shift, especially if an optimal sample moves from one chip period to another.

Figure 6:
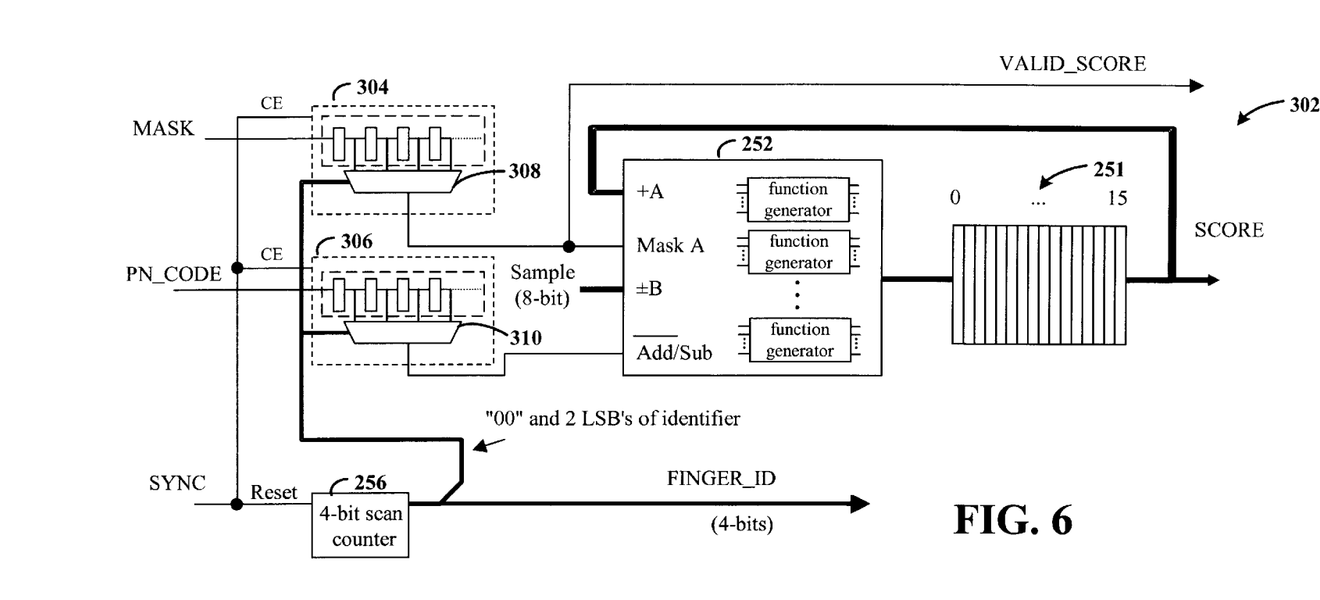
FIG. 6 is a functional block diagram of an example tracking de-spreader arrangement in accordance with one embodiment of the invention.
Figure 7:
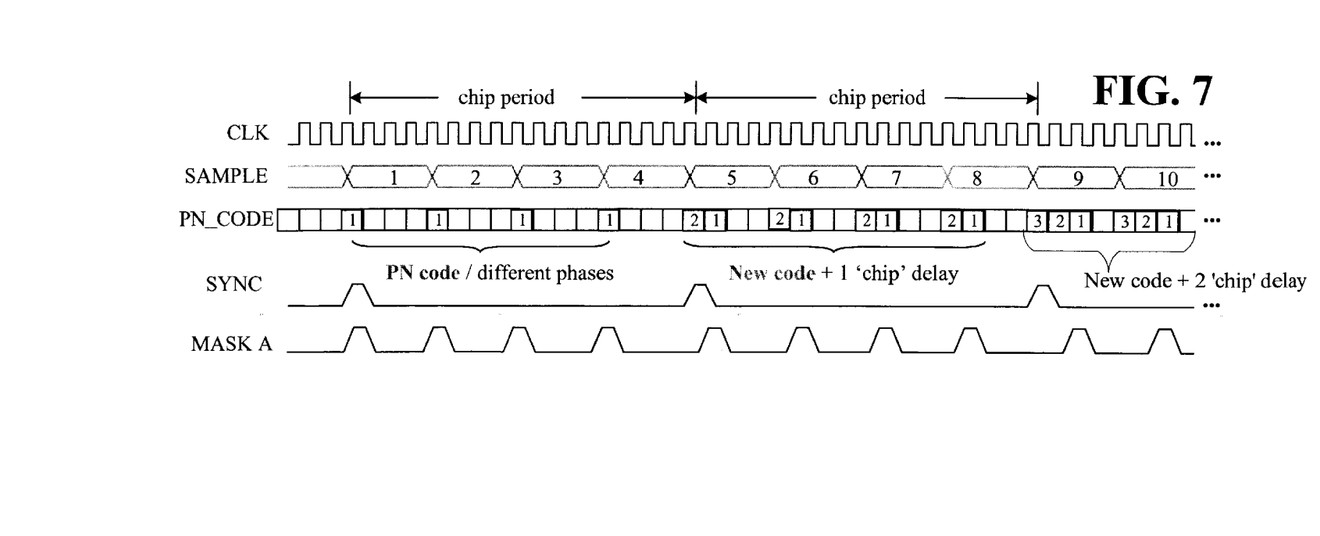
FIG. 7 is a waveform diagram that illustrates operation of the tracking circuitry of FIG. 6.

FIG. 6 is a functional block diagram of an example tracking de-spreader arrangement in accordance with one embodiment of the invention. The specific example tracking de-spreader 302 is arranged for correlating a PN code over multiple chip periods (e.g., 4 chip periods) by delaying and reapplying the PN code over the selected number of periods. FIG. 7 is a waveform diagram that illustrates operation of the tracking circuitry of FIG. 6. Each accumulation of a correlation score is performed at the chip rate. The 16× clock enables 16 accumulations to be performed in a chip period (4 PN code bits×4 samples). The same PN code is used with different samples in the same data period and in ensuing data periods in order to track the signal.

Four samples are processed in each chip period, which in the example spans 16 CLK cycles. A SYNC pulse begins each chip period. The example of FIG. 7 begins with application of the PN code bit 1, and the samples are labeled 1–10.

In the first chip period, only PN code bit 1 is applied to each of the four samples, and the correlation values for the four samples are stored in the shift register arrangement (numbered 0–15, left-to-right). Thus, after the first chip period, shift register 3 has the correlation value for sample 4, code bit 1; shift register 7 has the correlation value for sample 3, code bit 1; shift register 11 has the correlation value for sample 2, code bit 1; and shift register 15 has the correlation value for sample 1, code bit 1.

In the second chip period, new correlation values are started for PN_CODE bit 1 as applied to the next four samples (5–8). Similarly in the third chip period (only partially shown), new correlation values are started for PN_CODE bit 1 as applied to samples 9–12, and in the fourth chip period (not shown), new correlation values are started for PN_CODE bit 1 as applied to samples 13–16. The waveform of the MASK A signal applied to adder subtractor 252 overlaps the application of PN_CODE bit 1 so that a new correlation value is started for PN_CODE bit 1 in each of the four chip periods. Thus, the correlation values for a PN code bit (or accumulated correlation values for a sequence of PN code bits) are tracked over a selected number of delays (chip periods), which permits identifying and correcting for transmission path delay.

Also in the second chip period, a new PN_CODE bit 2 is input (bit 2), and correlation values are accumulated for the new code bit 2. At the end of the second chip period, shift register 2 has the correlation value for sample 8, code bit 1; the third shift register has the correlation value for sample 8, code bit 2 accumulated with the previous correlation value (sample 4, code bit 1); the sixth shift register has the correlation value for sample 7, code bit 1; the seventh shift register has the correlation value for sample 7, code bit 2 accumulated with the previous correlation value (sample 3, code bit 1); the tenth shift register has the correlation value for sample 6, code bit 1; the eleventh shift register has the correlation value for sample 6, code bit 2 accumulated with the previous correlation value (sample 2, code bit 1); the fourteenth shift register has the correlation value for sample 5 code, bit 1; and the fifteenth shift register has the correlation value for sample 5 code 2 accumulated with the previous correlation value (sample 1, code bit 1). After the fourth chip period (not shown), PN_CODE bit 1 will have been correlated with all 16 samples in the 4 periods. It will be appreciated that beginning with the second chip period, the correlation values accumulated through PN_CODE bit 2 are tracked for 4 chip periods (samples 5–20).

In the fourth chip period (not shown), the input sequence of PN_CODE bits over the 16 CLK cycles is:

4321 4321 4321 4321

The MASK A signal is pulsed at the appropriate time to mask feedback when PN_CODE bit 1 is applied to the samples (13–16, not shown). After the example 4 cycles, the time at which the MASK signal is reapplied to block 304 for a chip period in order to cause the generation of 16 pulses at the MASK A input over the next 4 chip periods depends on the data bit duration (e.g., from 4 chips to 512 chips). Although 4 chip periods are used to start the process, the process may run without masking the feedback until the process starts again (e.g., in response to a power-up or a reset event). As each of the 16 accumulations are started sequence, the VALID_SCORE signal indicates output of valid correlation scores from shift register arrangement 251.

In the fifth chip period (not shown), the input sequence of PN_CODE bits over the 16 CLK cycles is:

5432 5432 5432 5432

The process described above continues until the PN_CODE is restarted, at which point the process begins anew.

Adder subtractor 252, scan counter 256, and shift registers 0–15 are comparable to the elements in de-spreader 250 (FIG. 4). The FINGER_ID output from scan counter 256 identifies the correlation value relative to the 16 CLK cycles in the chip period.

Blocks 304 and 306 represent FPGA function generators that are configured as shift registers, where each bit in a shift register is addressable via a multiplexer (308 and 310). An example implementation is described in the patent by Bauer.

Only the two LSBs of the counter value are used to select from the input MASK and PN_CODE values since a maximum of 4 PN_CODE bits are processed considered in any given chip period. It will be appreciated that a greater number of shift registers (e.g., >16) would permit tracking correlation values across additional chip delays.

Even though tracking de-spreader 302 illustrates an embodiment for a single PN code, it will be appreciated that multiple PN codes could be processed by implementing a circuit clocked at a greater rate, having the additional multiplexing as shown in FIG. 6, and having a suitable number of shift registers to store correlation values.

Figure 8:
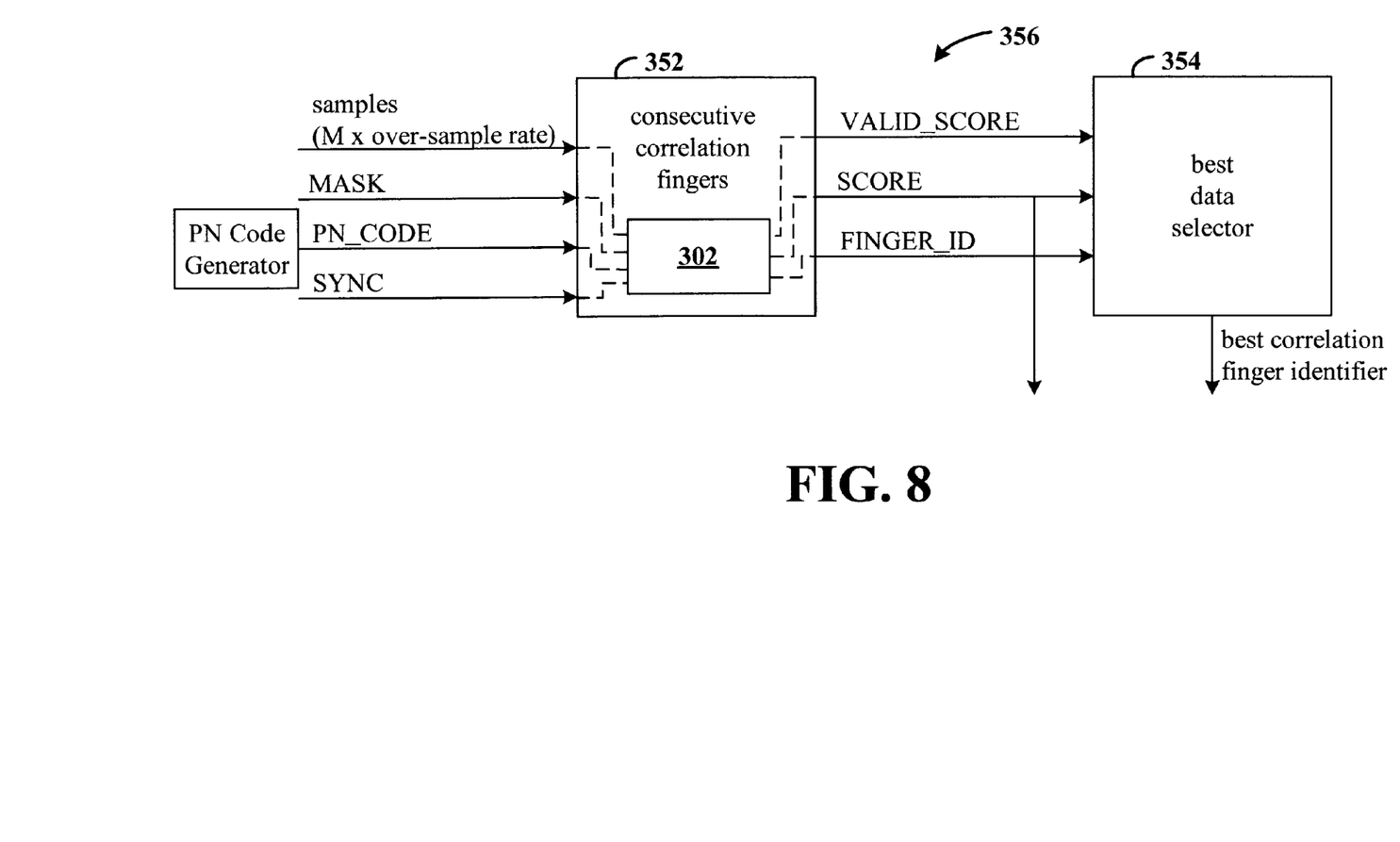
FIG. 8 is a functional block diagram of a tracking de-spreader arrangement in another embodiment of the invention.

FIG. 8 is a functional block diagram of an example correlation circuit arrangement. The example correlation circuit arrangement includes multiple consecutive correlation fingers (block 352) of the type described in FIG. 6, and best data selector 354 coupled to the output ports of the correlation fingers. Since tracking de-spreader 302 only generates correlation values, additional logic is required to determine which sample provided the most suitable correlation and to detect changes in transmission path delay.

Consecutive correlation fingers block 352 is an instance of tracking de-spreader arrangement 302 of FIG. 6. At the end of each data period, block 352 generates 16 correlation scores. Each of the correlation scores represents an attempt to recover the data associated with a single PN code. This means that all 16 fingers are being used to identify a single communication for one propagation path. Multiple instances of arrangement 356 may then be used to correlate with other propagation paths for the same user or for other users.

Since the path of the transmitted signal can vary, resulting in a varying time delay of the transmitted signal to the receiver, the best correlation can be achieved when the correlation with the PN code is performed with the received data in perfect phase. Perfect phase is a combination of being in the correct chip period, and due to the bandwidth restrictions, as close to the mid-point of the chip period as possible. Pulse shaping of the transmitted signal to limit bandwidth provides the greatest amplitudes at the mid-point of the chip period only, and it is from these points that highest correlation will result.

Each of the 16 correlation scores from block 352 corresponds to a different path delay. For the example arrangement 302 of FIG. 6, each correlation score is a result of ¼ of a chip period additional delay. This means that the 16 results span 4 chip periods and can also identify the mid-chip position within ⅛ of a chip period (i.e., samples taken at equal times before and after the true mid-point; as one moves further away, the other must get nearer). It will be appreciated that compromises can be made between the number of chip periods covered and resolution (oversample) within a chip period.

Although the nearest mid-chip position of the in-phase PN code should give the best correlation, interference by another communication in the multiple access environment may result in another of the samples within the code period producing greater correlation scores by being less effected by the interference.

If an initial estimate can be made of which PN code timing is to be in phase, the PN code applied to arrangement 356 could be made starting 2 chip periods early. Thus, it would be expected that a middle one of the 16 correlation scores would be greatest. Arrangement 356 permits some reasonable level of inaccuracy in identifying the exact phase. Furthermore, there is no need to identify the phase within a chip period to locate the mid-point. This greatly reduces the computational requirements for phase identification.

Generating 16 correlation scores raises the issue that for every one score that is most useful, there are 15 scores that are not. To reduce computational overhead for the next stage of processing, best data selector 354 is coupled to arrangement 352. Selector 354 identifies which of the 16 scores is of most value for the following data processor (not shown).

The identification of which of the 16 scores is also useful feedback for a controlling circuit (not shown) to determine whether the PN sequence requires a course adjustment within a −2 to +2 chip period window. Since the adjustment is course, the adjustment does not need to be made rapidly (e.g., once a second may be sufficient), thereby reducing the processing required of the controller. Since changes in timing are also hard to achieve seamlessly, less frequent changes are desirable.

As the 16 correlation scores are produced at the end of each data period, the best data selector determines which is the best score. Ultimately the best score is the one which has the greatest amplitude. Since each score is also a representation of +1 and −1 values, the absolute values of the scores must be considered by the selector.

In one example implementation, best data selector 354 identifies the greatest of the 16 scores, which can be efficiently implemented in the logic of an FPGA as compared to sending all scores to an external processor.

Due to the environment of CDMA, it is possible that incorrect correlation scores may be identified as being the best for a few data periods. To combat incorrect data selection, damping by best data selector 354 is desirable to prevent rapid movement from one sample position to another. The damping can be achieved by averaging the scores. For each of the 16 time slots, an average score calculation is performed. The more scores that are averaged, the greater the damping and the slower the ability to track fast changing transmission path delays. However, greater damping reduces the probability of selecting incorrect scores.

A true average is not required since a sum of values can provide a comparable metric for comparing results. Since the division factor used in the averages would be the same for all scores, the division factor is unnecessary. Even though selector 354 does not compute a true average, the term "average" will be used herein to describe the sum of correlation scores.

One form of average is to "integrate and dump". In this method, the score for each given time slot would be accumulated with previous scores for the same time slot. After a selected number of data periods, average values are available for the respective time slots. At this time, the largest value is used to identify the time slot providing the best data, and the accumulators are reset (accumulated value discarded and new averages be started). During the time that the average values are accumulated, the identification of the time slot producing the best data is fixed. In one embodiment, a combination of a maskable adder 252 and shift register arrangement 251 (FIG. 6) could be arranged to provide the integrate and dump function for the 16 time slots.

In another embodiment, best data selector 354 implements a running average. Running average values are generated in each data period, thereby permitting a continuous adjustment in best data selection. For each time slot, the sum of a selected number of previous scores for the same time slot is calculated. The previous scores are stored in a memory, for example a shift register arrangement. It is also possible to realize that an arrangement of a maskable adder, an adder/subtractor, and shift registers comparable to that previously discussed can be used to achieve the time multiplexed implementation required for the calculation of running averages over 16 time slots.

The present invention is believed to be applicable to a variety of de-spreading circuit arrangements and is believed to be particularly applicable and beneficial in FPGA implementations. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A multi-finger correlation circuit arrangement responsive to a stream of input sample values, comprising:
   a plurality of pseudo-random noise (PN) code generators, each configured to generate a respective PN code;
   a PN code selector coupled to the PN code generators;
   a shift register arrangement including a plurality of multi-bit locations for storing correlation values corresponding to each finger and having an output port at a last one of the locations; and
   an adder-subtractor having a first input port arranged to receive the stream of sample values, a second input port coupled to the PN code selector, and a third input port coupled to the output port of the shift register arrangement, wherein the adder-subtractor selects between add and subtract functions for application to values at the first and third input ports responsive to the PN code at the second input port.

2. The circuit arrangement of claim 1,
   wherein the adder-subtractor further includes a mask input port, and responsive to a mask signal at the mask input port masks input data at the third input port; and further comprising
   a mask control circuit coupled to the mask input port and configured to generate a mask signal at an end of a PN code.

3. The circuit arrangement of claim 1, wherein a plurality of function generators of a programmable logic device are configured to implement the adder-subtractor.

4. The circuit arrangement of claim 3, wherein a plurality of function generators of a programmable logic device are configured to implement the shift register arrangement.

5. The circuit arrangement of claim 1, wherein a plurality of function generators of a programmable logic device are configured to implement the shift register arrangement.

6. A tracking correlation circuit arrangement for a de-spreader, the circuit arrangement being responsive to an input PN code and a stream of n input sample values per chip period, comprising:
   a first shift register arrangement including m * n multi-bit locations for storing correlation values and having an output port at a last one of the locations, wherein m is a number of chip periods over which a PN code bit is applied to input sample values;
   a second shift register including n bit storage elements, each bit storage element having an output port and a first one of the bit storage elements being arranged to receive the PN code;
   a selector coupled to the output ports of the bit storage elements of the second shift register and arranged to sequentially select bit values from the bit storage elements for each sample value in a chip period; and
   an adder-subtractor having a first input port coupled the output port of the first shift register arrangement, a second input port coupled to the output port of the second shift register, and a third input port arranged to receive the stream of sample values, wherein the adder-subtractor selects between add and subtract functions for application to values at the first and third input ports responsive to the signal at the second input port, the adder-subtractor further including a mask input port, and data at the third input port is masked responsive to a mask signal at the mask input port.

7. The circuit arrangement of claim 6, wherein a plurality of function generators of a programmable logic device are configured to implement the adder-subtractor.

8. The circuit arrangement of claim 7, wherein a plurality of function generators of a programmable logic device are configured to implement the first shift register arrangement.

9. The circuit arrangement of claim 6, wherein a plurality of function generators of a programmable logic device are configured to implement the first shift register arrangement.

10. The circuit arrangement of claim 6, wherein a function generator of a programmable logic device is configured to implement the second shift register and the selector.

11. The circuit arrangement of claim 6, wherein respective correlation values are accumulated for m * n time slots over a selected number of chip periods, the selected number of chip periods comprising a data period, and further comprising a best data selector coupled to the output port of the first shift register arrangement, wherein the best data selector is configured to identify one of the m * n time slots having a correlation value matching predetermined criteria.

12. The circuit arrangement of claim 11, the best data selector is further configured generate running average values of the correlation values of the m * n time slots over a selected number of data periods, and the predetermined criteria is a greatest of the running average values.

13. The circuit arrangement of claim 11, wherein the best data selector is further configured generate average values of the correlation values of the m * n time slots over a selected number of data periods, and the predetermined criteria is a greatest of the average values.

14. The circuit arrangement of claim 11, wherein the best data selector is further configured to accumulate values of the correlation values of the m * n time slots over a selected number of data periods, and the predetermined criteria is a greatest of the accumulated values.

15. A correlation circuit arrangement, comprising:

a pseudo-random noise (PN) code generator configured to generate a PN code;

a storage element for storing a correlation value and including a plurality of input ports and output ports;

a mask control circuit having a plurality of output ports and a plurality of input ports coupled to the output ports of the storage element, the mask control circuit configured to mask the result value at selected times; and a plurality of function generators configured as an adder-subtractor, the adder-subtractor having a first set of input ports coupled to the PN code generator for selecting between add and subtract functions, a second set of input ports for receiving bits of a sample input value, a third set of input ports coupled to output ports of the storage element, a fourth set of input ports coupled to the mask control circuit, and a set of output ports coupled to the input ports of the storage element, the adder-subtractor configured to selectively add or subtract values at the second and third sets of input ports responsive to the PN code at the first set of input ports.

* * * * *